Patented Nov. 2, 1937

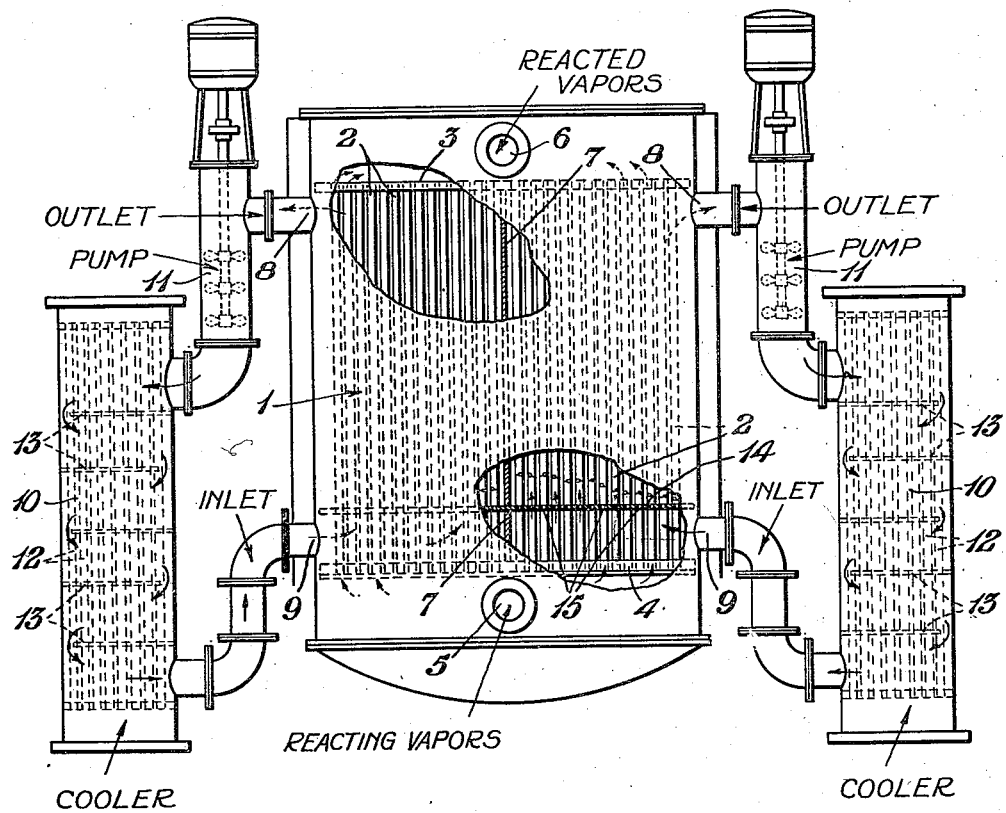

2,098,148

UNITED STATES PATENT OFFICE 2,098,148

VAPOR PHASE CATALYTIC PROCESS AND APPARATUS

Carl H. B. Jarl, Royal Oak, Mich., assignor to Beck, Koller & Company, Inc., Detroit, Mich.

Application February 26, 1937, Serial No. 127,979

2 Claims. (Cl. 23—288)

The invention relates to improvements in methods and apparatus for carrying out vapor phase catalytic reactions and particularly for carrying out exothermic vapor phase, catalytic oxidations requiring a delicate temperature control. Typical reactions of this nature are, for instance, oxidation of benzene to maleic acid, toluene to benzoic acid, naphthalene to phthalic anhydride, acenaphthene to naphthalic anhydride, anthracene to anthraquinone.

The provision for an accurate temperature control is necessary for large scale operation because if the temperature of the entire catalyst is not properly controlled, there is a tendency for portions of the catalyst to be over-heated in spots or to be of too low temperature, resulting in undesirable side reactions, lowering the yield and in many cases causing rapid destruction of the catalyst. The problem is complicated still further by the fact that many catalytic reactions take place with a velocity which is largely determined by the concentration of the reacting ingredients. Consequently, there is a tendency for a large part of the reaction to take place in the portion of the catalyst layer which comes in contact with fresh reaction gases, resulting in a hot spot at or near the gas inlet. As the catalyst is deteriorated at this point the hot spot travels farther into the catalyst layer thus resulting not only in destruction of the catalyst layer near the inlet but also in a progressive deterioration of the entire mass.

Several converter types have been employed in practice but none of them have been successful in overcoming the difficulty of controlling the reaction at the inlet of the gases. When tubular converters are employed the reaction temperatures can be controlled with a fair degree of success if the diameter of the tubes containing the catalyst is comparatively small but as soon as the diameter is increased the temperature control becomes more difficult resulting in a relatively cool surface in the portions close to the walls, but with an increase in temperature toward the center. Tubular converters prior to the present invention have therefore been limited to relatively small tubes, when employed for this type of reactions, and such converters are much more expensive to build than those containing larger tubes for the same catalyst capacity.

It is the object of this invention to overcome the difficulty of temperature control by partially cooling the catalyst at the point at which the highest temperature occurs and maintaining the entire catalyst mass at a substantially uniform and easily controllable temperature. To accomplish this I have according to the present invention, employed a converter consisting of a plurality of comparatively large tubes containing the catalyst through which the reacting gases are to pass, such tubes being surrounded by a bath of comparatively good heat transfer medium such as a mixture of fused sodium nitrite and sodium nitrate. The cooling of the tubes containing the catalyst is accomplished in a novel way. Heat dissipation in my converter is accomplished by pumping the cooling medium through an outside cooling chamber and circulating it back into the bath compartmant surrounding the tubes. The bath, after cooling, is directed against the tubes at the point where the main portion of the reaction takes place and where the temperature is highest, and being withdrawn from the converter for re-cooling at the point where least reaction takes place.

I am aware that outside coolers have been employed and I refer particularly to U. S. Patent No. 1,900,382 describing a converter employing an outside cooler. This converter although in some respects similar in design to my converter lacks an important feature which contributes to the success of my invention, namely: a perfectly uniform distribution of the bath at the layer at which cooling is most desirable.

The accompanying drawing illustrates the principles of my invention although the invention in its broad aspects is not limited to this particular design.

In the drawing:

1 is the converter comprising a plurality of vertical tubes, 2, rolled into two parallel tube sheets, 3 and 4. The tubes are filled with a suitable catalyst, of a type commonly employed in vapor phase oxidation, as for example, in the oxidation of naphthalene to phthalic anhydride, and the reacting vapors, which may be naphthalene and oxygen, enter the tubes 2, at the bottom through the manifold marked 5; the reacted vapors, which may contain phthalic anhydride or other partial oxidation product, leave through the top manifold 6, the principal portion of the reaction taking place near the bottom. The space between the tubes 2 is filled with a non-volatile heat conducting bath, or heat transfer medium, such as a mixture of fused sodium nitrite and sodium nitrate. The converter may be divided in two or more equal compartments by means of a vertical baffle plate 7. Each compartment is shown as connected through a top opening 8 and a bottom opening 9, to the outside cooler 10.

Circulation of the transfer medium is accomplished by means of an axial flow pump 11. The flow of bath is upward in the converter and downward in the cooler, the transfer medium leaving the converter at the top where the catalytic reaction is least and entering at the bottom where the reaction is greatest and consequently requiring the highest degree of cooling. The cooler 10 as shown consists of a tube nest 12, through which air, steam, or other liquid or gaseous cooling medium may be passed.

The bath compartment in the cooler is preferably provided with baffle plates 13, so as to give a zig-zag motion of the bath around the tubes. A short distance above the bottom tube sheet 4 in the converter is placed a horizontal baffle plate 14. This baffle, besides the holes necessary for the tubes to pass through, is provided with a great number of smaller vertical openings 15 spaced between the openings for the catalyst tubes.

The catalyst tubes are filled with catalytically inert material such as quartz or porcelain fragments in the space between the bottom tube sheet, 4, and the horizontal baffle plate, 14. This inert material serves only as a support for the catalyst, which is placed in the tubes above it to a level within a few inches of the top of the tubes, 2. The object of the baffle plate 14 is to provide the means for a uniform distribution of the cooled bath liquid adjacent to the catalytic reaction zone, this being accomplished by means of a great number of small holes through the baffle plate between the openings through which the catalyst tubes go. These openings are spaced in a manner to provide for a very good distribution of the liquid bath since the back pressure created by this baffle plate is sufficient to give the liquid a comparatively high velocity through the openings, which is particularly advantageous because the highest temperature is found right above the baffle plate.

The outside cooler is preferably of approximately the same height as the converter but is placed below it, in order to provide a space for expansion on the bath of the suction side of the pump, to keep the system from becoming airbound.

Cooling of the bath may be accomplished by any suitable means (not shown), such as circulating oil, steam, or other media through the tubes 12 in the cooler 10 and the degree of cooling can be regulated by the amount of cooling medium passed through the tubes. I have found that a very efficient and easily controllable cooling could be accomplished by blowing air through the cooler. This heated air if desired can be used for preheating the in-coming vapors. The amount of air can be regulated by any known means (not shown).

The object of the vertical baffle plates 7 is to divide the converter into substantially equal portions. It is obvious that if a larger converter be built it could be divided into any number of sections, each section provided with its own cooling system without deviating from the scope of this invention. It is also obvious that selection of materials which constitute the bath can be varied. Structural changes may also be made without departing from the invention, such as substituting for the axial flow pump, other types, such as reciprocating and centrifugal pumps. The cooling medium may enter the converter in a manner particularly advantageous for good distribution of the bath below the horizontal baffle, for instance, tangentially to the converter shell.

I claim:—

1. In a process for carrying out exothermic vapor phase reactions in a converter, which includes a plurality of tubes through which the reacting vapors are passed, which tubes are surrounded by a heat transfer medium, said process including circulating the transfer medium through an outside cooler and returning the cooled transfer medium to the converter at the hot end thereof; the improvement which comprises passing said transfer medium through restricted openings located just prior to the zone of highest temperature so as to provide substantially uniform distribution of the cooled bath fluid adjacent the catalytic reaction zone.

2. In an apparatus for carrying out exothermic catalytic vapor phase reactions consisting of a plurality of tubes containing a catalyst surrounded by a heat transfer bath which is cooled by circulating through an outside cooler and re-entering the bath compartment of the converter at the hot end thereof; said apparatus including a baffle plate through which the tubes pass, located just prior to the zone of highest temperature, said baffle plate having restricted openings through which the transfer bath is circulated, and serving to provide substantially uniform distribution of the cooled bath fluid adjacent the catalytic reaction zone.

CARL H. B. JARL.